United States Patent Office 3,175,908
Patented Mar. 30, 1965

3,175,908

PRODUCTION OF RELIEF PRINTING PLATES

Ernst M. Schneider, Stuttgart-Sonnenberg, Germany, assignor, by mesne assignments, to Kalle Aktiengesellschaft, Wiesbaden-Biebrich, Germany

No Drawing. Filed Dec. 14, 1959, Ser. No. 859,111
1 Claim. (Cl. 96—38)

This invention relates to the photomechanical production of relief printing plates for color printing, and especially for multicolor printing.

In multicolor printing, the increasing use of color diapositives with large depth of density as original negatives and the use of the usual masking techniques has been carried out, as a rule, by first of all producing a half-tone negative as a partial color component from the original (indirect color component process). However, for copying onto the metal printing plate, according to the known processes a screened negative is used. This is usually produced, from which a screen negative is then obtained. This procedure is time-consuming and expensive, because three sets of each of four photographic films or plates are required. This screen negative is copied on the metal of the printing plate and yields a positive image on it. The necessary color and tone value corrections must be carried out thereafter to obtain the required printing depth by partial etching of the individual printing plates. This operation is very difficult, and an excessive error, such as occurs by over-etching of a part of the image, cannot be corrected. This means that the whole work up to this point is wasted, since etching must be started over again with a new copy.

In one-color printing, heretofore a screened negative has been produced from the original, which is copied on the metal by means of a negative-producing light-sensitive layer. On this metal copy the tone value correction is carried out by manual coating followed by partial etching in acid. It is not possible to restore the whole range of tone values of the original to the screen negative, because, apart from the fact that in the conventional etching process account must be taken of the lateral point disintegration, the graduation of the reproduction suffers if it is so exposed by the screen image that in the most highly lighted parts a very sharp point end is produced. For this reason a single-stage etching procedure cannot be used by itself. The reason for this is the character of the screen which is used (crossed lines glass screen), which necessarily flattens out the gradation of the reproduction in the differently lighted parts.

According to the invention, on the other hand, in the photomechanical production of printing plates, which may be of metal or of synthetic plastics, for both single-color and multicolor printing a screen positive is produced from a photomechanically corrected half-tone negative and this is transferred directly by means of positive working light sensitive layer—that is, a layer producing a positive from a positive—onto the metal printing plate. This layer is resistant to the usual etching and solvent fluids and the usual stripping mediums as also against the solvent medium, so that the image-free parts can thereafter, preferably while avoiding a lateral point disintegration, be removed by etching, solution or mechanical means. In the production of printing plates from metal a one-stage etching process can thus be used.

The fact that in the new process a screen positive instead of a screen negative is used has the advantage that, in contrast to the negative, a positive of correct tone value can be produced (see Tritton and Wilson, Phot. J., 71, 396, 1939; Harrison, Mitchener and Lawson, J. of Photogr., 1955, 97, which point out the basic difference between the gradation curves of a screen negative and a screen positive). Whereas it is practically impossible to obtain the theoretically required curve in a screen negative, it is possible to obtain the ideal gradation in a screen positive if from the original a half-tone negative of proper gradation, which is achieved by a simply carried out photomechanical correction, is made and this corrected negative is then screened to a positive.

The new procedure has the further advantage that the necessary color and tone value corrections need no longer be carried out on the printing plate, but can be made on the screened photographic positive. This photographic material can be worked on more quickly and more safely by a chemical softening than can metal, for example, by an etching solution. The manual coating, which is usually carried out on metal with asphalt varnish, can be performed more quickly on photographic material, because only one coating is necessary and the coating varnish need not be dried by heating. Also errors of operation can be corrected very easily, without wasting all the preceding work. This is analogous to the usual procedure in photolithography in which an intermediate negative is produced, from which a new positive is obtained.

Finally the new process has also the advantage that in the production of metal printing plates the known single-stage etching procedures can be used. Because these etching procedures do not result in lateral point disintegration, but preserve all the tone values of the copy, the color and tone value corrections can be performed on the screen positive. The course of the process resembles therefore in a certain way the procedure in photolithography to the extent that also in the most highly lighted portions, taking into account the characteristics of relief printing, even a sharper point must be provided, whereas completely continuous recesses are avoided as far as possible. The invention has the further advantage that the corrected positive can be used for the production of as many more original printing plates as are desired by simple copying, so that the excessively expensive production of electroplate or synthetic resin duplicates is unnecessary and damaged printing plates can easily be replaced.

The new process also makes it possible to produce large printing plates in a simple way by connecting together individual positives (film montage) in a single piece, which have the dimensions of the form of the printing machine to be used.

But of course the new process can also be carried out successfully when using the conventional etching technique. It is only necessary in this case by carrying out the tone and color value corrections on the screen diapositive to take account of the lateral point disintegration during the later etching. The etching process itself is simplified, since the process corresponds to the etching of a simple black half-tone.

In carrying out the process a light-sensitive copy material which works positively is used. In the use of such a copy layer, the part exposed to the light is so changed in its constitution, that it can be dissolved away by a suitable developer, thus leaving the material of the printing plate exposed for the action of the etching or dissolving fluid, whereas the parts shielded from the light retain their resistance to the action of the etching or dissolving fluid. The copy layer is also resistant to the usual coating mediums such as asphalt varnish and to the solvents for them.

By using a copy material which consists of a suitably sensitized synthetic resin, the portions exposed to light become sensitive or soft, so that they can be removed by suitable solvents or by mechanical action to produce the relief while avoiding any lateral point damage.

The new process has also the advantage that the stripping operation (stripping of the picture-free part of the printing plate) can be carried out, not on the plate, but quick drying with color on the photographic positive, because the unexposed copy material is resistant to etching and solvent materials.

In the procedure for multi-color printing, partial screen positives are made from the corrected half-tone color component negatives. The finished color component diapositives corrected in color and tone values are advantageously copied together and by the single-stage etching process previously mentioned are etched in a group. This results in a saving, as compared with the known processes, of about one-third in materials and more than one-half in time.

In single color printing, the screen positive is produced by a contact process from a half-tone negative made from a light-masking film. The screen positive made in this way shows, as has been previously stated, a much smaller flattening of gradation that the screen negative usually used in single color printing. It is advantageous to produce the half-tone intermediate negative on a two-layer film (the usual light-masking film), which intensifies the image in the highlights. The screening is carried out, for example, with a contact screen which, in contrast with the cross-lined photogravure screen, assures a better tone value reproduction. The combination of the use of a negative on a light-masking film and the following contact screening to produce the positive makes possible, with a positively working copy material, the use of a single-stage etching process. The possibility of manual correction on the positive screen film also follows.

The following is an example of the carrying out of the invention:

*Example*

As the original, a small image color diapositive (24 x 36 mm.) is used. By known masking method a half-tone color component negative is produced, which by a contact process is screened by an ordinary contact screen to a positive. This photomechanically corrected screen positive is, as in photolithography, manually worked on to complete the tone and color value corrections. The four screen positives produced in this manner are then copied on a layer imposed on a zinc plate suitable for one-stage etching, such as microzinc. The layer has the property that it yields a positive from a positive, in which the light-exposed portions are soluble in an alkaline developer, while the unexposed portions retain their original resistance to etching and insolubility.

Such a layer can, for example, be composed of a solution of 3 grams of 4-[naphthoquinone-(1.2)-diazide-(2)-sulfonyloxy-(5)]-2-hydroxy-acetophenone in 100 cc. of ethylene glycol monomethyl ether, in which is dissolved 10 grams of an m-cresol-formaldehyde-novolak resin with a melting range (capillary method) of 108° to 118° C., an acid number of 0, and a normally clear color, and 3 grams of sesame oil. To this solution it is advantageous to add 0.5 part by weight of methyl violet BB, in order to make the picture richer in contrast. The solution is finally filtered.

The exposure is carried out in an ordinary chemigraphic centrifuge. The exposure is with a 60 ampere arc lamp for 4 minutes at a distance of one meter.

The layer exposed to light through the screen positive is then bathed in a 2% aqueous solution of trisodium phosphate, which contains 10–15% by volume of ethylene glycol monomethyl ether. The parts of the layer which have been exposed to light are dissolved by this solution. This can be done by rubbing the layer with wadding soaked in the solution and rinsing with water.

After drying, which must not result in burning, the complete set of color plates, such as four color component plates, are etched in a Dirats single-stage etching machine. The conditions are: Temperature, 81° F.; paddle wheel speed, 370 r.p.m.; etching time, 3 minutes.

Any suitable single-stage etching solution may be used. One suitable composition is as follows:

| | | |
|---|---|---|
| $HNO_3$(40° Bé.) | kg | 11.5 |
| Thinner | cc | 1800 |
| Concentrate | cc | 900 |

Balance water to make 85 liters.

The thinner and the concentrate are the separated components of a liquid which is known under the mark D116 and is furnished by Dirats Photoplate Company, Westfield, Mass.

The printing with the resulting plates is carried out in the usual manner.

While I have described herein some embodiments of my invention, I wish it to be understood that I do not intend to limit myself thereby except within the scope of the claim hereto or hereinafter appended.

I claim:

A process for producing a relief printing plate for at least single color printing purposes from a master, which process comprises producing a photomechanically corrected half-tone negative from the master to be reproduced, then producing a screen positive from the negative, performing color and tone value corrections on the positive, exposing to light through said positive a layer of a light-sensitive material on a base, parts of said layer being, by reason of such exposure, chemically modified by photomechanical action and rendered removable, removing the exposed portions of the layer by action of a solvent, and subjecting the base with the layer thereon to a single-stage etching process which is ineffective on the non-exposed portions of the layer.

References Cited by the Examiner

UNITED STATES PATENTS

| | | | |
|---|---|---|---|
| 358,817 | 3/87 | Jacobs | 96—32 |
| 1,885,725 | 11/32 | Howland | 96—32 |
| 2,099,916 | 11/37 | Wilkinson | 96—32 |
| 3,046,120 | 7/62 | Schmidt et al. | 96—91 |
| 3,046,124 | 7/62 | Schmidt et al. | 96—91 |

FOREIGN PATENTS 744,987 2/56 Great Britain.

NORMAN G. TORCHIN, *Primary Examiner.*

HAROLD N. BURSTEIN, WILLIAM B. KNIGHT, *Examiners.*